J. R. BROWN & W. A. FOSKETT.

Automatic Fire-Extinguisher.

No. 8,833. Reissued Aug. 5, 1879.

WITNESSES:

William L. Roop.

Joseph A. Miller Jr.

INVENTOR.

Joseph R. Brown

Wm A. Foskett by Joseph A. Miller attorney

UNITED STATES PATENT OFFICE.

JOSEPH R. BROWN AND WILLIAM A. FOSKETT, OF NEW HAVEN, CONN., ASSIGNORS TO THE PROVIDENCE STEAM AND GAS PIPE COMPANY.

IMPROVEMENT IN AUTOMATIC FIRE-EXTINGUISHERS.

Specification forming part of Letters Patent No. 166,452, dated August 10, 1875; Reissue No. 8,833, dated August 5, 1879; application filed April 21, 1879.

*To all whom it may concern:*

Be it known that we, JOSEPH R. BROWN and WILLIAM A. FOSKETT, both of the city and county of New Haven, State of Connecticut, have invented a new and useful Improvement in Automatic Fire-Extinguishers; and we hereby declare the following to be a full, clear, and exact description of the invention, which will enable others skilled in the art to make and use the same, reference being had to the accompanying drawings, forming part of this specification.

Figure 1:
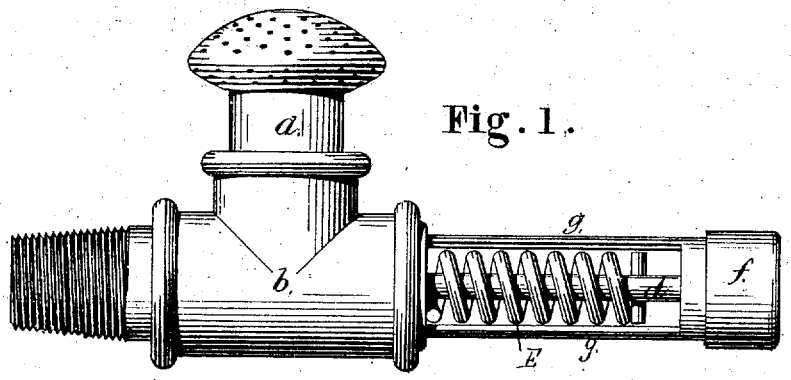
Figure 2:
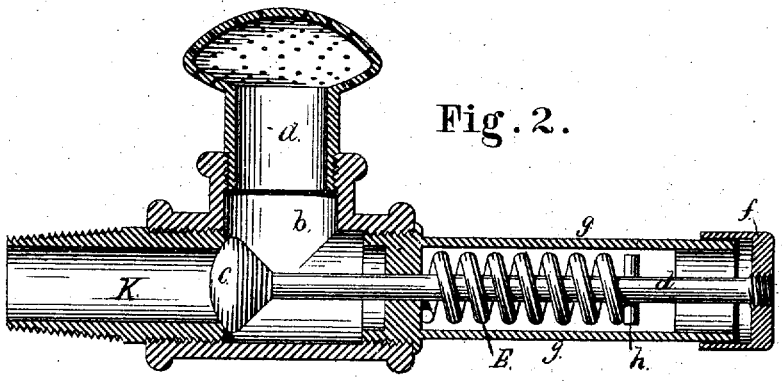

Figure 1 is a view of the device ready to be attached to the water-distributing pipes. Fig. 2 is a sectional view, showing the interior arrangement of the device.

The corresponding letters of reference indicate the same parts in the several figures of the drawings.

The object of this invention is to so arrange a valve in connection with a sprinkler and a water-pipe that the water shall be shut off from the sprinkler when there is no fire, but shall open as soon as the temperature is raised to a point indicating the presence of a fire.

The nature of the invention consists in the arrangement of the valve with the sprinkler and the fusible solder by which the valve-stem is held, as also in the arrangement of the parts, as will be more fully set forth hereinafter.

In the drawings, *a* is a sprinkler for distributing the water over a large area. It is secured to the T-shaped piece of pipe *b*. C is a valve, resting against the valve-seat formed by the pipe K. *d* is the valve-stem, secured to the valve C at one end, the other end being provided with the cap *f*. E is a spring, compressed when the valve is in its proper position, as shown in the drawings. *g g* are projecting arms, secured to the pipe *b* by a screw-thread, the other end being united by the cylindrical piece entering the cap *f*.

The invention relates to that kind of automatic fire-extinguishers in which the heat generated by a fire melts a fusible solder and admits the water to the sprinkler nearest the fire automatically.

The operation of the device is as follows: The cap *f*, secured to the valve-stem *d*, is forced down so as to compress the spring E until the cap passes over the cylindrical part uniting the arms *g g* sufficiently to be soldered to the same with a solder fusible at a given temperature. The arms *g g*, the valve C, valve-stem *d*, cap *f*, and spring E, being thus united, are screwed into the T-piece *b* until the valve C rests firmly against the valve-seat and forms a tight joint. The whole device is secured to one of a system of water-pipes. When a fire takes place near this device, the temperature of the air is rapidly raised, and as soon as the melting-point of the fusible solder is reached the cap *f* is released, and the valve is forced open by the spring E, assisted by the pressure of the water. The water flows into the sprinkler, and is thrown in a fine spray on the fire. This arrangement insures prompt and efficient action of the automatic apparatus, as the water cannot come in contact with the parts to which the solder is applied, as this part is removed from the pipe, and is so connected by arms that the atmosphere shall have free access to the same, and also prevent the conduction of heat from the same to the water in the pipes.

In place of the cap *f*, a button may be secured to the end of the valve-stem *d*, and soldered with fusible solder to the arms *g g*; or a disk may be permanently secured to the arms *g g*, and the valve-stem may be secured by fusible solder to the said disk.

Where the water-pipes supplying the distributing-pipes are connected to and supplied from a tank, and have but moderate pressure or head of water, the spring E insures the prompt opening of the valve C. When, however, a greater pressure of water is used, so that the prompt opening of the valve may be relied upon, the spring E may be dispensed with. By this arrangement, as soon as the fire is extinguished, a new valve, previously soldered to the arms, may be screwed into the pipe *b*, and thus the water shut off from the sprinkler; or the valve may be forced to its seat and soldered, as before.

The sprinkler may be removed, cleaned, or replaced, and kept in proper condition for prompt action. In large buildings this is of great importance, as by these means much damage by water is avoided.

Having thus described our invention, we claim as new and desire to secure by Letters Patent—

1. The combination, with a distributer of an automatic fire-extinguisher, of a valve-seat, a valve, and a valve-stem projecting horizontally, the valve being held against its seat by fusible solder, substantially as and for the purpose described.

2. In an automatic fire-extinguisher, the combination, with a supply-pipe and a distributer, of a valve and valve-stem projecting horizontally, the valve-stem being secured by fusible solder.

3. In an automatic fire-extinguisher, the combination, with the supply-pipe, the distributer, and a valve governing the flow of water into the distributer, of a device connected with the valve-stem by screw-thread engagement, and held in place by fusible solder, substantially as set forth.

4. In combination with the sprinkler *a*, secured to a branch of the T-piece *b*, the valve C, the stem projecting horizontally beyond the T-piece, and the cap *f*, or equivalent device, secured either to the valve-stem or to the projecting arms *g g* by fusible solder, substantially as and for the purpose described.

5. The combination, with the T-piece *b* and valve located therein and arranged to shut off the water from the distributer, of the valve-stem *d*, held against longitudinal displacement by a thin film of fusible solder, and spring tending to open the valve, substantially as set forth.

6. In an automatic fire-extinguisher, the combination, with a supply-pipe and distributer, of a valve held to its seat by a thin film of solder interposed between two metallic surfaces, substantially as set forth.

JOSEPH R. BROWN.
WM. A. FOSKETT.

Witness to signature of J. R. Brown:
JAMES D. S. BROWN.
Witness to signature of Wm. A. Foskett:
N. P. BISHOP, Jr.
Witness to both:
JOHN F. BISHOP.